US009122270B2

(12) United States Patent
    Sullivan

(10) Patent No.: US 9,122,270 B2
(45) Date of Patent: Sep. 1, 2015

(54) HYBRID ADAPTIVELY SAMPLED DISTANCE FIELDS

(75) Inventor: Alan Sullivan, Middleton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 751 days.

(21) Appl. No.: 13/350,220

(22) Filed: Jan. 13, 2012

(65) Prior Publication Data

US 2013/0185028 A1    Jul. 18, 2013

(51) Int. Cl.
    G06F 7/60       (2006.01)
    G06F 17/10      (2006.01)
    G05B 19/4069    (2006.01)
    G06T 17/00      (2006.01)

(52) U.S. Cl.
    CPC .......... *G05B 19/4069* (2013.01); *G06T 17/005* (2013.01); *G06T 2200/04* (2013.01)

(58) Field of Classification Search
    USPC ........................................................... 703/2
    See application file for complete search history.

(56) References Cited

U.S. PATENT DOCUMENTS 6,396,492 B1 *  5/2002  Frisken et al. ................ 345/420
2011/0245954 A1  10/2011  Sullivan et al.

OTHER PUBLICATIONS

Frisken et al.: "Adaptively Sampled Distance Fields: A General Representation of Shape for Computer Graphics." Computer Graphics. Siggraph 2000 Conference Proceedings. New Orleans, LA. Jul. 23-28, 2000. p. 249-254.
Perry et al." Kizamu: A System for Sculpting Digital Characters," Computer Graphics. Siggraph 2001. Conference Proceedings. Los Angeles, CA. Aug. 12-17, 2001. p. 47-56.
Thiago Bastos et al.: "GPU-accelerated Adaptively Sampled Distance Fields," Shape Modeling and Applications, 2008. SMI 2008. IEEE International Conference On, IEEE, Piscataway, NJ, USA, Jun. 4, 2008. p. 171-178.

* cited by examiner

*Primary Examiner* — Saif Alhija
(74) *Attorney, Agent, or Firm* — Dirk Brinkman; Gene Vinokur

(57) ABSTRACT

A computer program product for processing a model of an object according to a set of instructions includes a non-transitory computer-readable memory storing a model of an object represented by a hybrid adaptively sampled distance field (ADF), wherein the model includes a hierarchy of cells, wherein at least one cell includes a set of distance functions forming at least part of a boundary of the object and a set of distance samples of at least some of the distance functions, such that a processor executing the set of instructions processes the model of the object.

12 Claims, 12 Drawing Sheets

600

HYBRID ADAPTIVELY SAMPLED DISTANCE FIELDS

FIELD OF THE INVENTION

The invention relates generally to simulating numerically controlled (NC) machining, and more particularly to simulating NC machining using hybrid adaptively sampled distance fields.

BACKGROUND OF THE INVENTION

Numerically Controlled Machining

Simulating the process of numerically controlled (NC) machining is of fundamental importance in computer aided design (CAD) and computer aided manufacturing (CAM). During simulation, a computer model of a workpiece is edited with a computer representation of an NC machining tool and a set of NC machining tool motions to simulate the machining process.

The workpiece model and tool representation can be visualized during the simulation to detect potential collisions between parts, such as the workpiece and the tool holder, and after the simulation to verify the final shape of the workpiece.

The final shape of the workpiece is affected by the selection of the tool and the tool motions. Instructions for controlling these motions are typically generated using the CAM system from a graphical representation of the desired final shape of the workpiece. The motions are typically implemented using numerical control programming language, also known as preparatory code or G-Codes, see the following standards RS274D and DIN 66025/ISO 6983.

The G-Codes generated by the CAM system may not produce an exact replication of the desired shape. In addition, the movement of the NC tool is governed by motors of the NC machining machine, which have predetermined speeds, accelerations, ranges of motion, so that the actual tool motions may not exactly follow the NC machine instructions.

Discrepancies between the actual final-shape of the workpiece and the desired shape of the workpiece may be very small. In some situations, these discrepancies can result in undesirable gouges or nicks in the surface of the final shape of the workpiece with sizes on the order of a few micrometers in depth and width, and tens of micrometers in length.

Typically, a set of NC machine instructions are tested by machining a test workpiece made of softer, less expensive material prior to machine the workpiece. If visual inspection of the test workpiece locates undesirable discrepancies in the test workpiece, then the NC machine instructions can be modified accordingly.

This manual testing is time consuming and expensive. Time for machining a single test workpiece may be on the order of hours and several iterations may be required before an acceptable set of NC machine instructions is attained.

Thus, it is desirable to test for these discrepancies using computer-based simulation and rendering. However, in order to detect discrepancies with dimensions on the order of a few micrometers for workpieces, which may have dimensions on the order of meters, very precise computer models are required.

Swept Volumes

During machining, a tool moves relative to the workpiece according to a prescribed tool motion, referred to herein as a tool path, where the tool path can contain information about the relative position, orientation, and other shape data of the tool with respect to the workpiece.

As the tool moves along the tool path, the tool carves out a "swept volume." During machining, as the tool moves along the tool path, a portion of the workpiece that is intersected by the swept volume is removed. This material removal can be modeled in the computer as a constructive solid geometry (CSG) difference operation, in which the portion of the workpiece is removed from the workpiece using a CSG subtraction operation on the swept volume and the workpiece.

To provide high precision machining simulation, it is necessary to have a precise representation of the swept volume. Thus, it is an object of the present invention to provide a space and time efficient method for representing and rendering high precision models of swept volumes.

Although NC machining simulation is used as an example herein, swept volumes have applications in many areas of science, engineering, entertainment, and computer graphics. Some specific applications include computer-aided design, freeform design, computer-based drawing, animation, solid modeling, robotics, manufacturing automation, and visualization to name but a few. The following description applies to all areas where an accurate representation of a swept volume is required or desired.

Although NC machining simulation usually performs in three-dimensional coordinate systems, the term 'swept volume' can be extended more generally to N-dimensional coordinate systems. In particular, the following description also applies to areas swept out by a one-dimensional or two-dimensional shape moving along a path in a two-dimensional space, or to a hyper-volume swept out by a shape moving over a path or surface in higher dimensional spaces.

An overview of the importance and challenges in swept volume research is presented in "Swept Volumes: Foundations, Perspectives, and Applications", International Journal of Shape Modeling, 2006, Abdel-Malek, Blackmore, and Joy. They conclude that research in this field is limited by the difficulty of implementing complex mathematical formulations of sweeps in computer software and that computing the boundaries of swept volumes remains a challenging problem requiring better visualization tools and more accurate methods.

The swept volumes of simple shapes moving along simple paths can sometimes be represented analytically, as described in U.S. Pat. No. 4,833,617. However, those methods do not generalize to complex shapes and complex tool paths.

Several approaches approximate the swept volumes of polygonal shapes. Models of polygonal shapes can be encoded in a spatial hierarchy for efficient editing via the CSG operations as in "Interactive CSG" Proceedings, Technical Sketches, SIGGRAPH, 1999, Butcher, or for efficient collision detection as in U.S. Pat. No. 6,099,573.

A method for approximating the swept volume of a polygonal object is described in "Computing Swept Volumes", Journal of Visualization and Animation, 2000, Abrams and Allen.

U.S. Pat. No. 6,862,560 describes a method for simulating machining using CSG operations on polygonal models of swept volumes. In that method, the boundary of the workpiece is encased in a set of cells, where each cell contains references to swept volume polygons that intersect the cell. Intersections between the workpiece and the swept volume polygons within a particular cell can be processed on demand to generate a high precision rendering of the machined surface in a small region of interest. However, visualizing the full model at high precision is prohibitively slow. In addition, the generation of the swept volumes and the processing of the intersections are not described.

U.S. Pat. No. 6,993,461 describes representing an object as a polyhedron. The object is placed along the path at discrete time steps using a series of transformations. Edges and faces of the polyhedral representation that lie on the boundary of the swept volume are determined at each time step, and connected to generate a polyhedral approximation of the swept volume.

The accuracy of each of these polygonal methods is limited by the polygonal representation of the object model. Billions of polygons may be required to accurately represent the curved surface of a complex tool, especially if the radius of curvature is small. Thus, those methods either have limited accuracy or they have prohibitive processing times and memory requirements for generating high precision models of swept volumes or both. In addition, methods that approximate the swept volume as a series of discrete time steps have limited precision between the time steps, and are subject to aliasing artifacts.

Another common representation for machining simulation is known as the Z-buffer (depth) or Dexel method. That approach is described in "Real-time Shaded NC Machining Display", Proceedings, SIGGRAPH 1986, van Hook. U.S. Pat. No. 7,149,668 describes a similar method in which the workpiece is modeled by a grid of straight lines all in the z-direction and the machining simulation is performed by moving the tool model over the grid and modifying the height of the lines representing the workpiece that are intersected by the tool.

Dexel methods typically suffer from limited resolution, especially in directions not aligned with the z-axis, and are not suitable for generating high precision models of swept volumes.

Dexel representations are related to voxel-based representations. In "Volume Visualization," IEEE Computer Society Press, 1991, Kaufman describes voxel-based representations, as well as methods for rendering and processing voxel-based representations. In "Sculpting: an Interactive Volumetric Modeling Technique", Proceedings, SIGGRAPH 1991, Galyean and Hughes, and "Volume Sculpting:, Proceedings, SIGGRAPH 1995, Wang and Kaufman, both simulate sculpting using CSG operations on voxel-based representations of objects.

Methods that use binary voxels to represent swept volumes include U.S. Pat. No. 6,044,306, and "Method and Apparatus for Shaping Geometric Shapes" and "Octree-based Boundary Evaluation for General Sweeps", Proceedings, TMCE, 2008 Erdim and Ilies. Those methods both have accuracy limited by the size of the smallest voxel used to represent the swept volumes.

Distance Fields

Distance fields are an effective representation for rendering and editing shapes, as described in U.S. Pat. Nos. 6,396,492, 6,724,393, 6,826,024, and 7,042,458. Specifically, the distance fields are a form of implicit functions that are used to represent an object. A distance field is a scalar field that gives the shortest distance to the surface of the object from any point in space. A point at which the distance field is zero is on the surface of the object. The set of points on the surface of the object collectively describe the boundary of the object, also known as the d=0 isosurface. The distance field of an object is usually signed such that the sign of the distance field for a point inside the object is opposite the sign of the distance field for a point outside the object. For example, the distance field has a positive sign for points inside the object, and a negative sign for points outside the object.

Distance fields can be used to represent and render swept volumes. In "Sweeping of Three Dimensional Objects", Computer Aided Design, 20(4), 1990, Martin and Stephenson, described a theoretical foundation for defining the envelope of a swept volume in terms of an implicit function. In "Function Representation for Sweeping by a Moving Solid", Proceedings, Solid Modeling, 1995, Sourin and Pasko represented swept volumes using implicit surfaces. However, implicit surfaces can be difficult to render, and a suitable implicit representation for an arbitrarily complex tool shape is difficult to define.

A procedure for computing the distance field of an object is called a distance field function. For very simple objects, such as a plane, a sphere or a cylinder, the distance field function can be an analytic function with a closed form. For more complex objects an analytic function may not be possible. However, a numerical procedure may still be possible. For example, U.S. patent application Ser. No. 12/468,607 describes a numerical procedure for determining the distance field of a swept object, such as a swept machining tool.

For still more complex objects, there may not be a simple numerical procedure that can be used to compute the distance field of the object. For example, a machined workpiece can have a very complex surface such that a numerical procedure cannot compute the distance field of the object. In this case, the distance field of the object can be computed by sampling and reconstruction.

Sampling involves determining and storing values of the distance field at a set of locations in space. Reconstruction uses the stored values and a reconstruction function to compute the distance field of the object at points where the distance field was not sampled. A common approach to sampling is to sample the values of the distance field on a regular 3D grid of locations (regular sampling) that are evenly spaced. A common 3D reconstruction function is trilinear reconstruction where the eight samples that surround a point are combined together using a trilinear interpolation function to compute the value of the distance field at the point.

Regular sampling of a distance field is very simple, but may not be very efficient. The shape of the object may be such that there are regions in space where the distance field changes slowly and there are many very similar samples such that an accurate distance field could be reconstructed with far fewer samples (over sampled). Likewise, there may be regions of space where the distance field is changing quickly such that the number of samples is not sufficient to accurately reconstruct the distance field (under-sampled).

Adaptively sampled distance fields (ADFs) use detail-directed sampling to provide a much more space and time efficient representation of distance fields than is obtained using regular sampling. A type of ADF called a sampled ADF stores the samples of the value of the distance field in a spatial hierarchy of cells where the size of the cells, which is inversely related to a density of samples, is smaller where the distance field changes rapidly, and larger in regions where the distance field changes slowly. By using a locally varying density of samples, a sampled ADF avoids over-sampling some regions and under-sampling other regions. Each cell of the sampled ADF contains distance field samples and is associated with a reconstruction method for reconstructing the portion of the distance field associated with the cell. Distance field samples can include the values of the distance field, as well as the gradients and partial derivatives of the distance field. The distance field within a cell can be reconstructed from the distance data samples only when needed to minimize memory and processing time.

Sampled ADFs that store sample values of the distance field of the object provide a useful way to trade-off model accuracy with memory requirements. The accuracy of the reconstructed distance field is related to the number of distance field samples within a cell, as well as the reconstruction function, and the size of the cell. The accuracy of the reconstructed distance field can be increased in a number of ways: the number of samples in a cell could be increased, or the amount of information associated with each sample could be increased, or the size of the cell could be decrease.

For example, a triquadric reconstruction function is more accurate than a trilinear reconstruction function but requires 27 scalar distance field samples, whereas the trilinear reconstruction function only requires 8 scalar distance field samples, a more than 3-fold increase in the data per cell. Alternatively, the minimum cell size in the ADF can be reduced to increase accuracy, but this also increases memory since the number of cells needed to fill a given volume will also increase. However, to obtain very high accuracy (~1 micron) using a sampled ADF can require a prohibitively large amount of memory and processing time when simulating a large workpiece.

ADFs can be used to simulate editing using CSG operations. The model to be edited and the editing tool can be represented as distance functions, regularly sampled distance fields, or ADFs. The editing process can generate the ADF of the edited shape explicitly, for example by modifying the ADF of the model.

Alternatively, the edited shape can be represented implicitly as a composite ADF. The composite adaptively sampled distance field (CADF) is generated to represent the object, where the composite ADF includes a set of cells arranged in a spatial hierarchy. Each cell in the composite ADF includes a subset of the set of geometric element distance field functions and a procedural reconstruction method for combining the subset of geometric element distance field functions to reconstruct a composite distance field of a portion of the object represented by the cell. Each distance field in the subset of distance fields forms a part of the boundary of the object within the cell, called the composite boundary.

A procedure for determining the subset of the set of geometric element distance field functions within a cell should only include in the subset those distance field functions whose boundaries form parts of the composite boundary within the cell. The procedure for determining the subset must be fast but also accurate or the resulting composite boundary will not be correct. For example, a ray sampling procedure, such as described in U.S. patent application Ser. No. 12/751,591, can be used. However, the ray sampling procedure can result in errors in the determination of the subset of distance field that cannot be easily detected.

Composite ADFs can reconstruct the distance field of a machined object with very high accuracy. The distance field function of the set of geometric elements can be computed with high accuracy by analytic or numerical methods and their values combined also with high accuracy. The resulting surface is very detailed with surface features that may be smaller than 1 micron for a simulated object that is in the order of 1 cubic meter. However, the reconstruction of this very accurate surface can be slow limiting the usability of the method.

Thus, there is a need to improve on the existing method used to determine the subset of the set of geometric element distance fields within the cells of a composite ADF to reduce errors in the reconstructed composite boundary of the object. Additionally, there is a need for a method to improve the speed of reconstruction of the composite boundary of the object to improve the usability of the composite ADF representation.

SUMMARY OF THE INVENTION

It is an object of present invention to provide a space and time efficient method for representing and rendering such high precision models for machining simulation. It is another object of various embodiments of the invention to provide an alternative representation of a model of an object to improve usability and processing the model. It is further object of some embodiment to provide the model that improves speed and accuracy of reconstruction of composite boundary of the object, and facilitates processing of the model for various simulation and graphic rendering tasks.

Some embodiments of the invention are based on a counterintuitive realization, that in order to save memory required for simulation of the machining, the amount of data stored has to be increased. Accordingly, embodiments of the invention disclose a hybrid adaptively sampled distance field (ADF).

The hybrid ADF represents the object by a set of cells. At least one cell in the hybrid ADF includes data associated with samples of the distance field, e.g., a set of distance samples, and a subset of a set of geometric element distance fields, e.g., a set of distance functions. Associated with both types of data are procedural reconstruction methods to reconstruct a distance field of the portion of the object represented by the cell.

Accordingly, in various embodiment of the invention, the model of then object is represented by a hybrid adaptively sampled distance field. In one embodiment, the model of the object includes a hierarchy of cells, wherein at least one cell includes a set of distance functions forming at least part of a boundary of the object and a set of distance samples of at least some of the distance functions.

For example, the shape of the object may be represented by a shape distance field. The path may be represented by a parametric function. A swept volume distance field can be represented by a swept volume generated by moving the shape along the path, where the swept volume distance field is defined in a continuous manner according to a swept volume reconstruction method.

The swept volume reconstruction method reconstructs the swept volume distance field at a sample point. An optimal set of parameters of the parametric function is determined in a continuous manner, where the optimal set of parameters defines an optimal placement of the shape along the path. The shape distance field is transformed to the optimal placement to produce a transformed shape distance field. Distance data are determined from the transformed shape distance field at the sample point to reconstruct the swept volume distance field at the sample point.

The hybrid ADF is edited to incorporate the swept volume distance field into the hybrid ADF. A set of edit cells of the hybrid ADF is determined from the swept volume, and the hybrid ADF is reconstructed within the set of edit cells, where the regeneration incorporates the swept volume distance field into the set of edit cells of the hybrid ADF to simulate the machining of the object by moving the shape along the path.

The hybrid ADF exhibits a dual nature that enables either an approximate reconstruction of the distance field of the object from the distance field samples, or an exact reconstruction of the distance field of the object from the subset of the set of geometric element distance fields.

Additionally the distance field samples are used to improve the quality and performance of the regeneration and rendering of the hybrid ADF. Furthermore, the hybrid ADF simplifies the culling procedure, increases effectiveness of the rendering process, provides more accurate approximation of the surface of the object, and opens an opportunity for flexible representation of the object.

Accordingly, one embodiment of the invention discloses a computer program product for processing a model of an object according to a set of instructions. The product includes a non-transitory computer-readable memory storing a model of an object represented by a hybrid adaptively sampled distance field, such that a processor executing the set of instructions processes the model of the object.

The model may include a hierarchy of cells, wherein at least one cell includes a set of distance functions forming at least part of a boundary of the object and a set of distance samples of at least some of the distance functions. For example, the set of distance samples can be determined for each vertex of the cell.

In some variations of this embodiment, the cell includes a reconstruction function for reconstructing a distance field within the cell from the set of distance samples, and a combining function for combining geometric elements represented by the set of distance functions to determine a composite surface of the cell. Also, the cell may be associated with at least one type. The types indicate relationships of the cell with a boundary of the object. The relationships can include an intermediate cell, an exterior leaf cell, an interior leaf cell, and a boundary leaf cell. For example, the at least one type may include a first type determined based on the set of distance samples, and a second type determined based on the set of distance functions. Also, the cell may includes a sampled type identifier describing whether the cell includes children cells having distance samples, and a composite type identifier describing whether the cell includes one or more children cells having distance functions.

Another embodiments of the invention discloses a method for generating a model of an object represented by a hybrid adaptively sampled distance field (ADF) formed by a spatial hierarchy of cells, wherein at least one particular cell is associated with a set of distance samples and a set of distance functions. For each particular distance function and for each particular cell, the method includes sampling a particular distance function for a particular cell to produce a particular set of distance samples; modifying the set of distance samples of the particular cell with the particular set of distance samples; and modifying the set of distance functions of the particular cell with the particular distance function, wherein the steps of the method are performed by a processor. For example, the sampling may be performed for each vertex of the particular cell, and the method may include determining based on signs of values in the particular set of distance samples whether a surface of a geometric element represented by the particular distance function intersects the particular cell.

In some variations, the modifying the set of distance functions of the particular cell may be based on the set of distance samples of the particular cell. Similarly, the modifying the set of distance samples of the particular cell may be based on the set of distance functions of the particular cell. Furthermore, the cell may be associated with a sampled type determined based on the set of distance samples, and a composite type determined based on the set of distance functions, wherein the sampled and the composite types indicate a relationship of the cell with a boundary of the object, and wherein the types are selected from a group consisting of an intermediate cell, an exterior leaf cell, an interior leaf cell, and a boundary leaf cell.

Hence, in some variations of the embodiment, the method includes checking sampled subdivision criteria for the sampled type of the cell and composite subdivision criteria for the composite type of the cell; and generating children of the cell if at least one of the sampled subdivision criteria or the composite subdivision criteria is met. For example, the method may include determining an error between a surface reconstructed from the set of distance samples and a surface determined by combining the set of distance fields; and checking the sampled subdivision criteria based on the error.

Similarly, the method may include determining a number of distance fields in the set of distance fields; and checking the composite subdivision criteria based on the number. Also, the method may include determining a set of distance samples of a child cell of the cell based on the set of distance functions of the cell.

Yet another embodiment discloses a method for determining a simulation of a machining of a model of an object with a set of swept volumes represented by a set of distance fields. The method includes initializing the simulation using a hybrid adaptively sampled distance field (ADF) formed by a spatial hierarchy of cells, wherein a particular cell includes a set of distance functions forming at least part of a boundary of the object and a set of distance samples of at least some of the distance functions; sampling a particular distance function for the particular cell to produce a particular set of distance samples; modifying the set of distance samples of the particular cell with the particular set of distance samples; determining based on signs of values in the particular set of distance samples whether a surface of a geometric element represented by the particular distance function intersects the particular cell; determining based on the values in the particular set of distance samples whether the particular distance function forms a composite surface of the model of the object within the particular cell; modifying the set of distance functions of the particular cell with the particular distance function, wherein the steps of the method are performed by a processor; and rendering the simulation into a memory.

The method may also include one or combination of reconstructing, based on the set of distance sample, an approximate surface of the model of the object within the particular cell using the set of distance samples; determining approximate intersection points of a set of rays with the approximate surface; determining exact intersection points of the set of rays with the composite surface based on the approximate intersection points and the set of distance functions; determining, based on the exact intersection points, pixel values associated with each ray in the set of rays; rendering at least part of the approximate surface; and rendering at least part of the composite surface.

The method may also include culling the particular distance function based on the set of distance samples. For example, the culling may include determining an error between the set of distance samples and the particular set of distance samples; and culling the particular distance function based on the error.

DETAILED DESCRIPTION OF EMBODIMENTS

System and Method Overview

Figure 1:
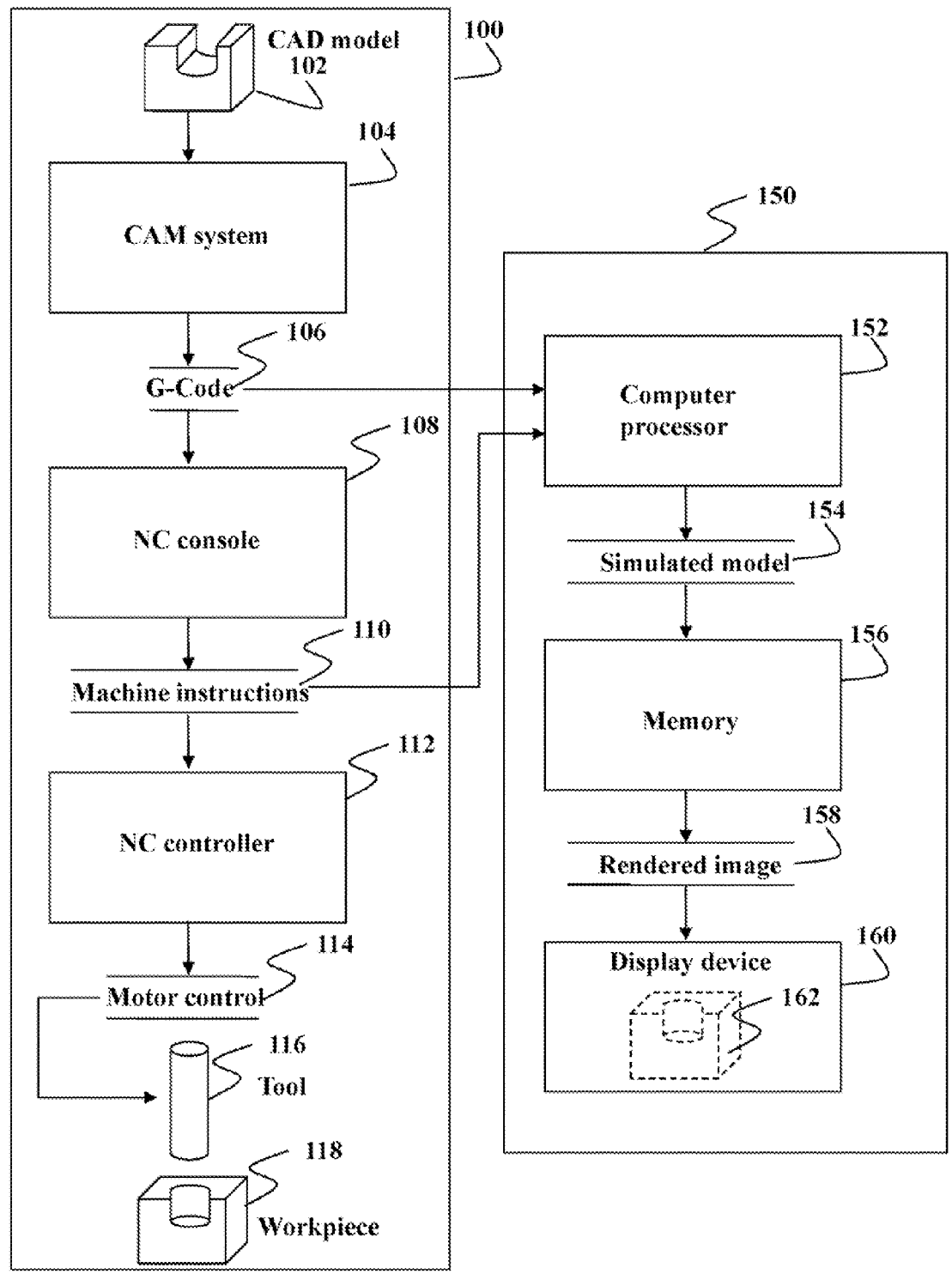
FIG. 1 is a flow diagram of an NC machining machine and a system and method for simulating NC machining according to embodiments of the invention.

FIG. 1 shows an example of an NC machining system 100, and a numerically controlled (NC) machining simulation system 150. In the NC machining system 100, a computer aided design (CAD) model 102 is input to a computer aided manufacturing (CAM) system 104, which generates G-Codes 106 for controlling the NC machining system. During NC machining, the G-Codes are input to an NC machining console 108, which processes the G-Codes to produce a corresponding set of NC machine instructions 110. The NC machine instructions are input to an NC controller 112, which produces a set of motor control signals 114 to move a tool 116 relative to a workpiece 118 to machine, e.g., to mill the workpiece.

The simulation system 150 can take as input either the G-Codes 106 generated by the CAM system 104, or the NC machine instructions 110 generated by the NC console 108. The input to the simulation system is read by a computer processor 152, which simulates machining of the workpiece, and outputs a simulated model 154, which can be stored in a memory 156. The memory can be included into a computer program product for processing a model of an object. For example, the memory can include a non-transitory computer-readable memory storing the model 154 and a set of instructions, such that a processor 152 executing the set of instructions processes the model of the object.

For example, the processor 152 renders the stored model 154 to generate a rendered image 158 which can be output to a rendering device 160, e.g., a display, or printer device. A rendered image 162 can be compared to the CAD model 102 to verify the correctness of the G-Codes 106 or NC machine instructions 110 prior to performing the actual NC machining of the workpiece. In various embodiments of the invention, the memory 156 stores a model of the object represented by a hybrid adaptively sampled distance field, as described in more details below.

Tools

Figure 2A:
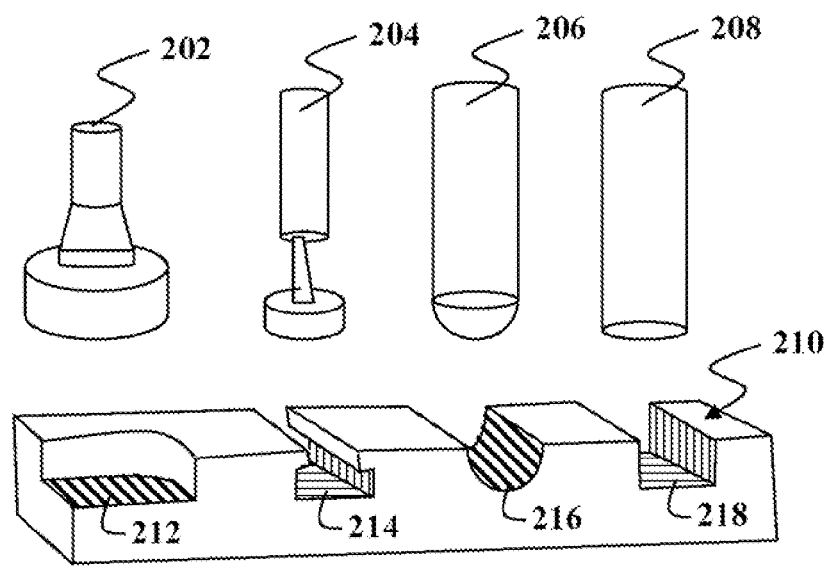
FIG. 2A is a diagram of typical tools used for machining and typical edits in a workpiece made by moving the tools along a path.

FIG. 2A shows a set of typical tool shapes 202, 204, 206, and 208 used in NC machining. When a tool is moved relative to a workpiece 210, the tool carves material out of the workpiece. Here, the tools 202, 204, 206, and 208 remove material corresponding to surfaces 212, 214, 216, and 218 from the workpiece. The shape of the material removed by each tool is determined by the tool shape and the path of the tool relative to the workpiece. The shape of the material removed is the intersection of the workpiece and the swept volume of the tool as the tool moves along the path.

Although we focus here on NC machining simulation, swept volumes have applications in many areas of science, engineering, and computer graphics including computer-aided design, freeform design, solid modeling, robotics, manufacturing automation, and visualization.

Swept Volume

Figure 2B:
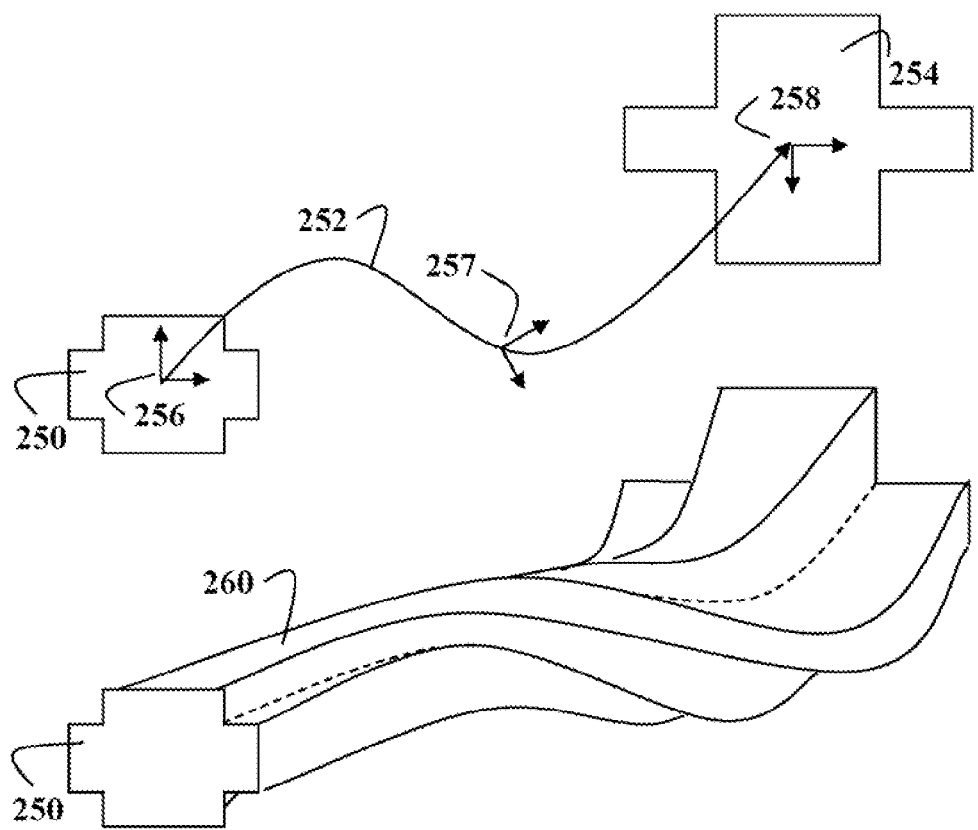
FIG. 2B is a schematic of a swept volume determined by sweeping a 2D shape along a curved path.

FIG. 2B shows the swept volume 260 of a shape 250 that is moved along a path 252. The path 252 specifies a position of a particular point of the shape 250 as a function of time. The path can specify an orientation 256, 257, and 258 of the shape as a function of time. The path can also specify a scale of the shape or an arbitrary transformation of the shape as a function of time. In FIG. 2B, the original position, orientation, and geometry of a shape 250 is transformed to a final position, orientation, and geometry of the shape 254 as it moves along the path.

Tool Paths

The path of the tool relative to the workpiece can be specified in many forms.

Figure 3A:
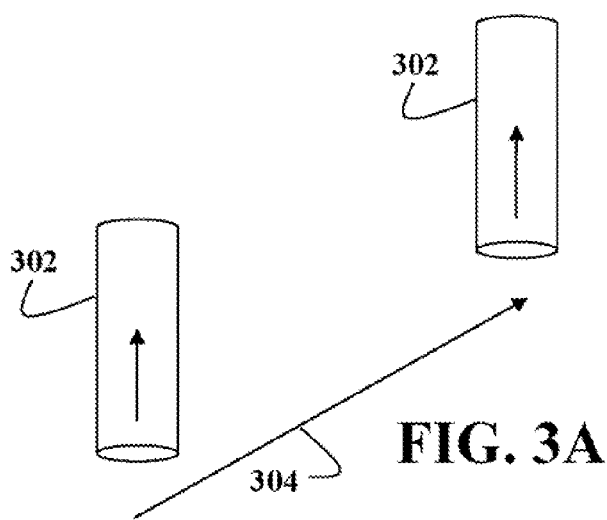
FIG. 3A is a schematic of a linear path of a tool.

FIG. 3A shows a linear path, in which a tool 302 is moved along a straight line 304.

Figure 3B:
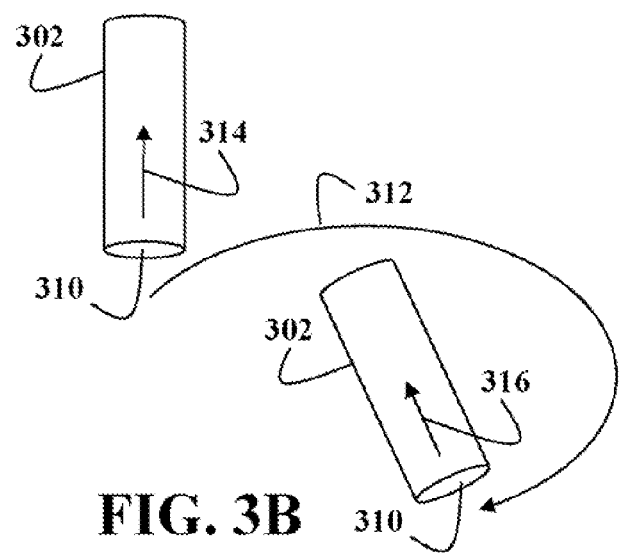
FIG. 3B is a diagram of an arc path of a tool in which the tool axis changes along the path.

FIG. 3B shows a circular arc path, in which a tip 310 of the tool 302 is moved along a circular arc 312, and an original axis direction 314 of the tool is transformed to a final axis direction 316 at the end of the path.

Figure 3C:
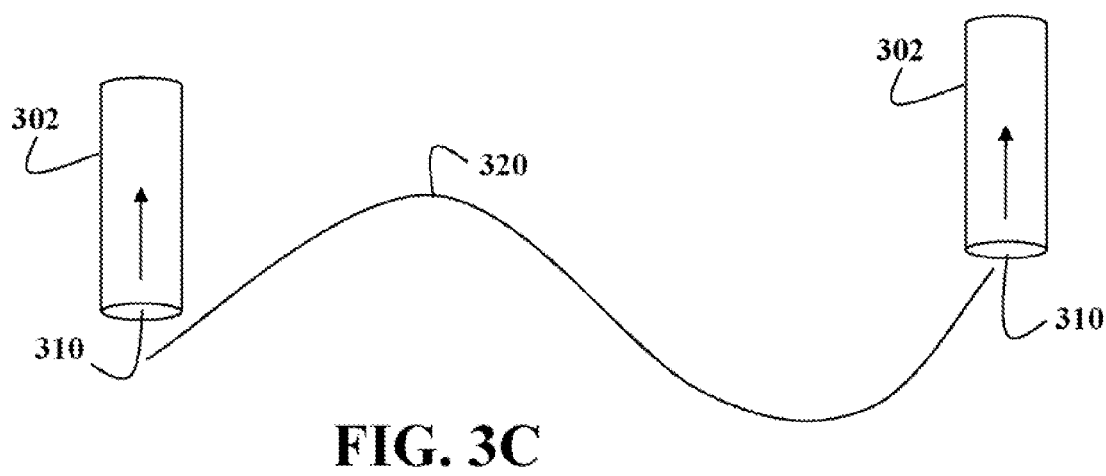
FIG. 3C is schematic of a curve path of a tool.

FIG. 3C shows a curved path, in which the tip 310 of the tool 302 is moved along a curve 320.

Other possible path forms include positioning the tool at a point, moving the tool along a sequence of lines known as a polyline, moving the tool along a spiral or helical curve, moving the tool along a polynomial curve, such as a quadratic Bezier curve or a cubic Bezier curve, or a sequence of polynomial curves known as a piecewise polynomial curve, to name but a few. Any form of path that can be simulated can be used by various embodiments, including a path defined by a procedure influenced by the shape or material composition of the workpiece.

Hybrid Adaptively Sampled Distance Field

Figure 4:
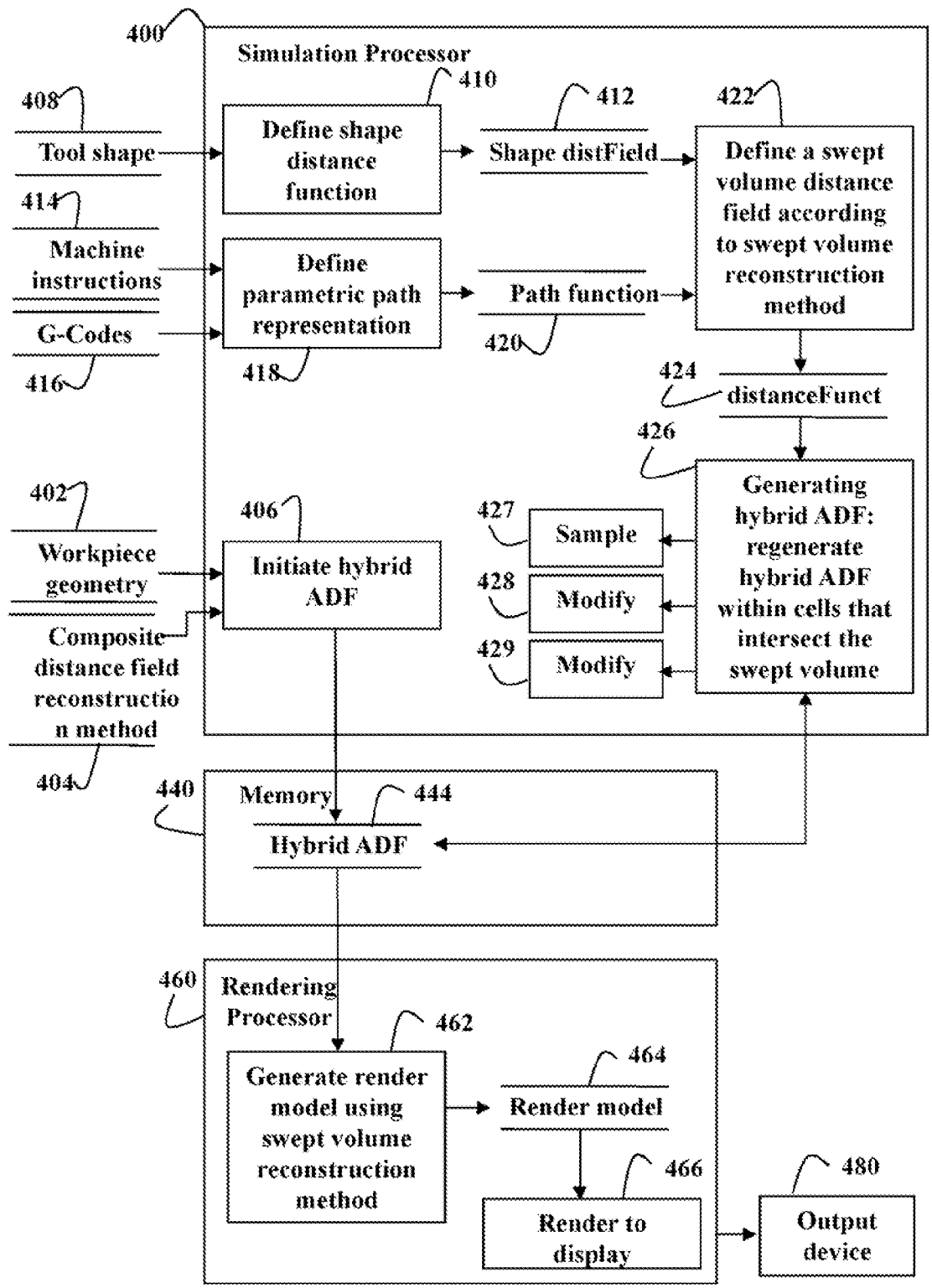
FIG. 4 is a flow diagram of method for simulating machining of a workpiece with a tool shape using a set of G-Codes or NC machine instructions according to an embodiment of the invention.

FIG. 4 shows a method for simulating machining, e.g., milling of a workpiece with a tool shape using a simulation processor 400, storing a representation of the machined workpiece in a memory 440, and rendering the representation of the machined workpiece using a rendering processor 460 to an output device 480. This method uses a model 444 of an object represented by a hybrid adaptively sampled distance field (ADF). However, an application of the hybrid ADF is not limited to simulating machining applications.

The hybrid ADF is formed by a spatial hierarchy of cells; wherein at least one particular cell is associated with both a set of distance samples and a set of distance functions, as described below. The generation of the hybrid ADF proceeds interactively for each cell. Initially, a shape of the workpiece and a method for reconstructing a composite distance field from a set of distance fields 404 can be used to initialize the hybrid ADF 444, which may be stored in the memory 440. Subsequently, the cells of the hybrid ADF can be modified and/or generated 426, if, e.g., the cell intersects a surface of a geometric element, e.g., a tool 408, represented by a distance function 424. The workpiece shape is specified by workpiece geometry 402, which includes a set of geometric elements.

Each geometric element of the workpiece geometry is converted to a distance field representation specifying a set of geometric element distance fields. Each geometric element distance field can be represented as an analytic distance function, an implicit distance function, a regularly sampled distance field, an ADF, a composition of distance functions, or a procedure, to name but a few. In this disclosure, a term "distance function" or "distance field" is used to represents all equivalent representation of the geometric elements.

In one embodiment, the hybrid ADF is stored in a memory as an octree structure, which is generated in a top down manner starting with a root cell representing a bounding box of the workpiece shape. A distance field representation of each geometric element in the workpiece geometry 402 is added to leaf cells of the hybrid ADF. The distance fields are influenced by that geometric element. During processing, e.g., rendering, the distance field of a leaf cell can be reconstructed at a sample point by combining the distance fields within the leaf cell using the composite distance field reconstruction method 404.

A variety of combining methods are possible and used by embodiments of the invention. In one embodiment, the combining uses a Boolean subtraction operator to simulate removal of material from the workpiece by the volume swept by the tool.

In one embodiment, at least one cell of the hybrid ADF includes two representations of the distance field, i.e., a sampled ADF representation and a composite ADF representation. These two representations are referred herein as the two aspects of the hybrid ADF cell, i.e., the sample ADF aspect represented by a set of distance samples of the cell and the composite ADF aspect represented by a set of distance functions of the cell.

A distance field representation of the geometric element in the workpiece geometry 402 is used to edit cells of the hybrid ADF whose distance fields are influenced by that geometric element, and accordingly, by the distance function of that geometric element. During the generation 426, both aspects of the cell can be modified. Specifically, in one embodiment, the generation 426 includes sampling 427 a distance function for each vertex of a cell to produce a subset of distance samples, modifying 428 the set of distance samples of the cell with the subset of distance samples, and modifying 429 the set of distance functions of the cell with the distance function.

The modification of the two aspects of the cell improves the quality of each representation. For example, in one embodiment, the modifying the set of distance functions of the cell is based on the set of distance samples of the particular cell. Similarly, in another embodiment, the modifying the set of distance samples of the cell is based on the set of distance functions of the cell:

If the addition of a new distance field to the hybrid ADF makes a distance field in a leaf cell irrelevant, then the irrelevant distance field is removed from the leaf cell. For example, if a tool motion removes all of the material from a leaf cell, all of the distance fields in the leaf cell may become irrelevant and the leaf cell is cleared of distance fields and labeled as an exterior cell. One of the advantages of dual nature of the hybrid ADF is that the set of distance samples allows for faster generation of the set of distance functions necessary to reconstruct the composite surface of the cell.

Thus, the simulation of a new tool motion may reduce the existing number of distance fields in a leaf cell and its siblings below the specified maximum number. In this case, the distance fields of the leaf cell and its siblings are placed in their shared parent cell and the leaf cell and its siblings are deleted from the composite ADF.

The machining simulation method defines 410 a shape distance field 412 representing a tool shape 408, where the shape distance field 412 can be an analytic distance function, an implicit distance function, a regularly sampled distance field, an ADF, a composition of distance functions, or a procedure, to name but a few.

For example, an NC machine instruction 414, or alternatively, a G-Code 416, can be used to define a parametric path function 420 corresponding to motion of the tool. For each tool motion, the shape distance field 12 and the parametric path function 420 define 422 the distance function 424 representing a surface of a geometric element, e.g., the swept volume of the tool corresponding to the tool motion.

The composite ADF 444 is edited 426 with the swept volume distance field 424 to simulate machining of the workpiece according to the tool motion. During editing, the swept volume distance field is added to cells of the composite ADF that are intersected by the swept volume of the tool, causing a regeneration of the ADF within the intersected cells.

The composite ADF can be used to generate 462 a render model 464, including render model elements, and rendered 466 to the output device 480. Rendering methods known to the art, such as point rendering, triangle rendering, and ray tracing, can be used to generate and render the render model 464.

In an alternative embodiment for machining simulation, each shape distance field corresponding to each NC machine instruction 414 or G-Code 416, and each distance field corresponding to each geometric element of the workpiece geometry 402 is assigned a unique identifier for the corresponding NC machine instruction, G-Code, or geometric element.

During the render model generation step 462, each particular element of the render model 464 is annotated with a unique identifier of the distance fields contributing to the particular render model element. By associating a set of render attributes with each unique identifier, the render model 464 encodes which geometric elements and which tool paths contribute to each part of the workpiece. For example, by associating a unique color with the identifier of the shape distance field of a particular G-Code, the region of the workpiece affected by the particular G-Code can easily be visualized on the output device 480.

Additionally or alternatively, opacity can be associated with the identifier of the distance field in the hybrid ADF. For example, render elements associated with a distance field corresponding to a tool motion can be rendered as transparent. Alternatively, the unique identifiers can be associated with a Boolean operator, where the Boolean operator indicates whether or not a corresponding render element should be rendered. Other render attributes can be used to generate additional effects to aid in visualization of the machined workpiece.

The hybrid ADF has numerous advantages in the simulation. One embodiment for machining simulation uses the hybrid ADF to verify the NC machining process. For example, the hybrid ADF 444 generated by the machining simulator 400 are compared to a distance field representation of the CAD model 102. The comparison can be made by visual inspection of the output.

Additionally or alternatively, the comparison can be made by sampling the hybrid ADF 444 and the distance field of the computer aided design model 102 at a plurality of sample points and comparing the distance data at the sample points. Alternatively, the comparison can be made by generating a difference distance field by subtracting one of the hybrid ADF 444 and the distance field of the computer aided design model 102 from the other and visualizing the difference distance field. Thus, the dual nature of the hybrid ADF facilitates the comparison and verification process.

The hybrid ADF can also be used to measure certain properties of the material removed by each tool motion. Additionally the distance field samples are used to improve the quality and performance of the regeneration and rendering of the hybrid ADF. For example, for a particular tool motion, an intersection distance field representing the intersection of the workpiece with a swept volume corresponding to the particular tool motion can be generated. The intersection distance field can then be processed to determine various properties of the material removed by the particular tool motion, including its mass, volume, or a moment of inertia, to name but a few. The hybrid ADF simplifies the culling procedure, increases effectiveness of the rendering process, provides more accurate approximation of the surface of the object, and opens an opportunity for flexible representation of the object.

Dual Nature of Hybrid ADF

Figure 5:
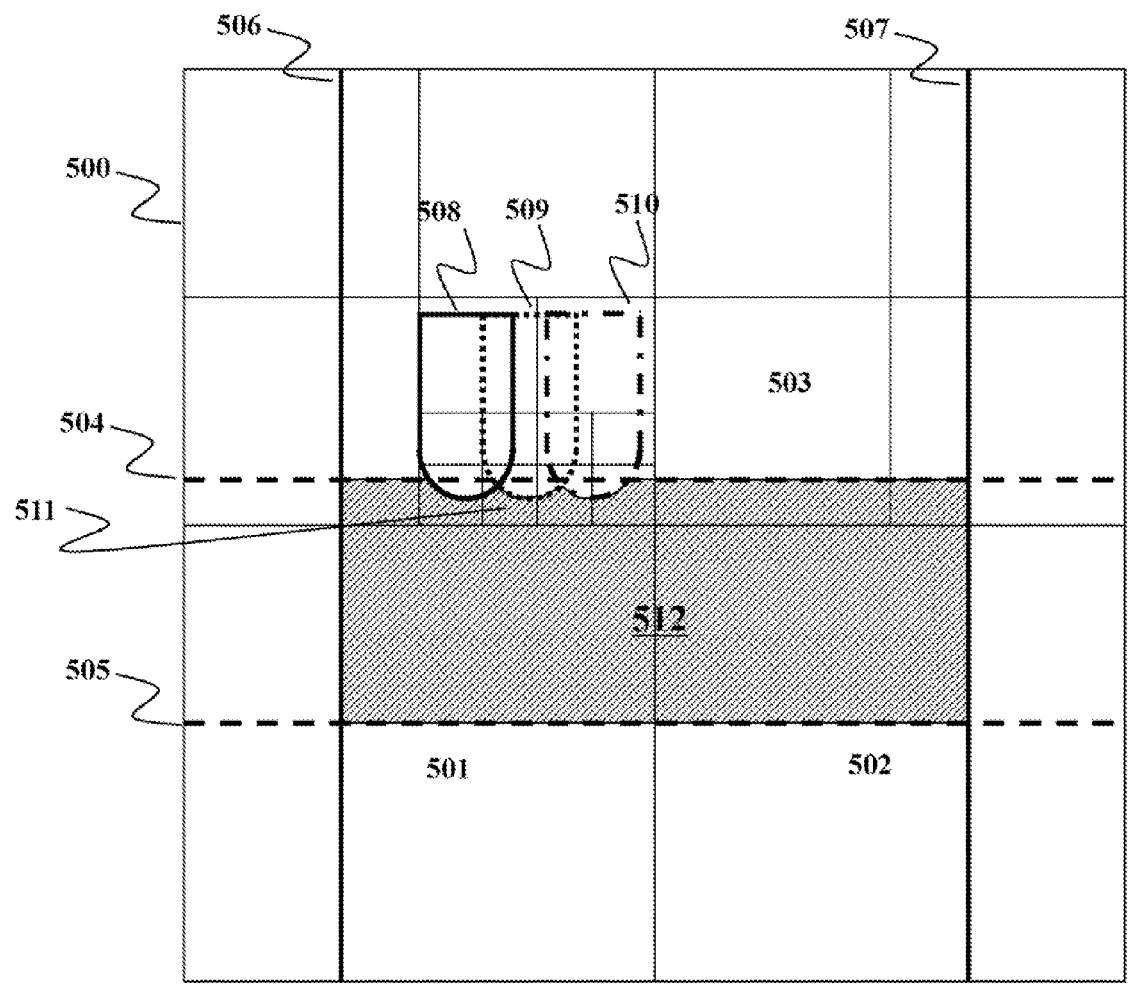
FIG. 5 is a schematic of a composite ADF.

FIG. 5 is a two dimensional (2D) illustration of a hybrid ADF 500 that includes a spatial hierarchy of cells, e.g., 501-503, arranged in an octree with each cell representing portions of the volume of the workspace as well as geometric element distance fields whose boundaries are indicted. In this example, the boundaries of geometric distance fields 504-507 are planes that defined the boundary of the initial workpiece.

Geometric element distance fields 508-510 are the boundaries of three geometric elements representing sweeps of a ball end mill tool 206. The cell 511 in the hybrid ADF is associated with a subset of the set of geometric element distance fields representing the original workpiece and the swept volumes of the machining tool.

For example, the subset of the set of geometric element distance fields associated with the cell 511 includes geometric element distance fields 504, 508, and 509 that together determine the hybrid ADF surface within cell 511. Also associated with the cell 511 is a procedural reconstruction method, such as Boolean difference, for combining the subset of the set of geometric element distance fields to reconstruct the composite distance field of the workpiece. We define a composite surface to be the boundary of the object including patches of the boundaries of the geometric element represented by distance functions.

Each cell of the octree is either an intermediate type cell or a leaf type cell of the data structure. A cell whose type is intermediate type has been further partitioned into smaller children cells, whereas a leaf type cell has not been partitioned into smaller children cells. The leaf type cells can either be entirely inside the boundary of the distance field, entirely outside the boundary of the distance field, or can contain the boundary of the distance field corresponding, to a set of points where the value of the distance field is zero. Therefore, each leaf cell can be an intermediate cell, an interior leaf cell, an exterior leaf cell or a boundary leaf cell.

Figure 6:
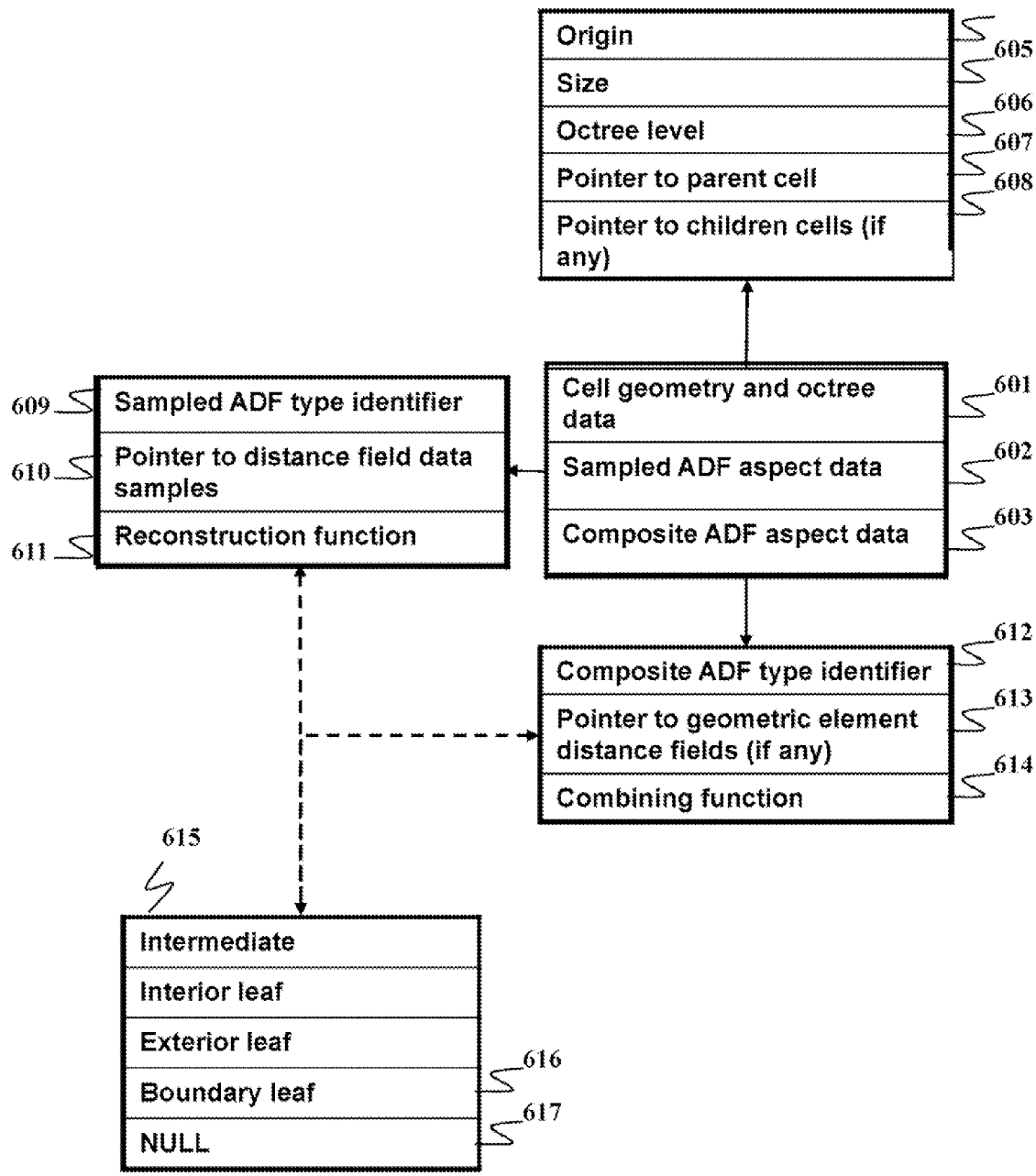
FIG. 6 is a block diagram of data structures associated with a hybrid ADF cell of the current invention.

FIG. 6 is an example of a data structure of a hybrid ADF cell 600. The following describes an example of the structure of the hybrid ADF, and is not intended to limit the scope of the invention. Associated with the cell are a set of data 601 describing geometry of the cell, such as an origin 604 of the cell, a size 605 of the cell, and/or a set of data describing position of the cell within the octree, such as its octree level 606, a pointer to a corresponding parent cell 607 and a pointer to the corresponding children cells 608, if the cell has any.

Additionally, the structure of the hybrid ADF cell can include two sets of distance field data associated with the two ADF aspects of the hybrid ADF. Associated with the cell, the sample ADF aspect 602 can include a sampled type identifier 609, a pointer to distance field value samples 610, if any, and a reconstruction function 611 to reconstruct the distance field within the cell from the distance field data samples 610. Associated with a hybrid ADF cell, the composite ADF aspect 603 can include a composite type identifier 612, a pointer to an array of geometric element distance fields 613, if any, and a combining function 614, such as Boolean difference function, that describes how to combine the geometric element distance fields to determine the composite distance field within the cell.

The cell is associated with at least one type indicating a relationship of the cell with a boundary of the object, and wherein the relationship is selected from a group consisting of an intermediate cell, an exterior leaf cell, an interior leaf cell, and a boundary leaf cell. The at least one type includes a first type determined based on the set of distance samples, and a second type determined based on the set of distance functions. For example, the cell can be associated with the first type represented by a sampled type identifier 609 describing whether the cell includes children cells having distance samples. Additionally or alternatively, the cell can be associated with the second type represented by a composite type identifier 612 describing whether the cell includes children cells having distance functions.

The sampled type identifier 609 describes whether the cell 600 has been partitioned into smaller child cells that have distance field data samples 610. The composite type identifier 612 describes whether the cell 600 has been partitioned into smaller cells that have an array of geometric element distance fields 613. Both type identifiers 609 and 612 can be one of the set of identifiers provided in table 615. If the sampled type identifier 609 indicates, that the cell is a leaf cell including the boundary of the distance field 616, then the sampled pointer 610 addresses an array of memory where the cells distance field samples are stored.

Similarly, if the composite type 612 of the cell 600 indicates that the cell 600 is a leaf cell including the boundary of the composite distance field 616, then the composite pointer addresses an array in memory where the data of the geometric element distance fields of the cell are stored. The hybrid ADF cell includes children cells if they are required by either the sampled ADF aspect, or composite ADF aspect of the cell. Similarly, the children cells of a hybrid ADF cell can only be removed if they are not required by either the sample ADF aspect or composite ADF aspect of that cell.

In some embodiments, the type identifiers of the cell for the sampled ADF aspect 609 and the composite ADF aspect 612 are determined independently from one another.

Figure 7:
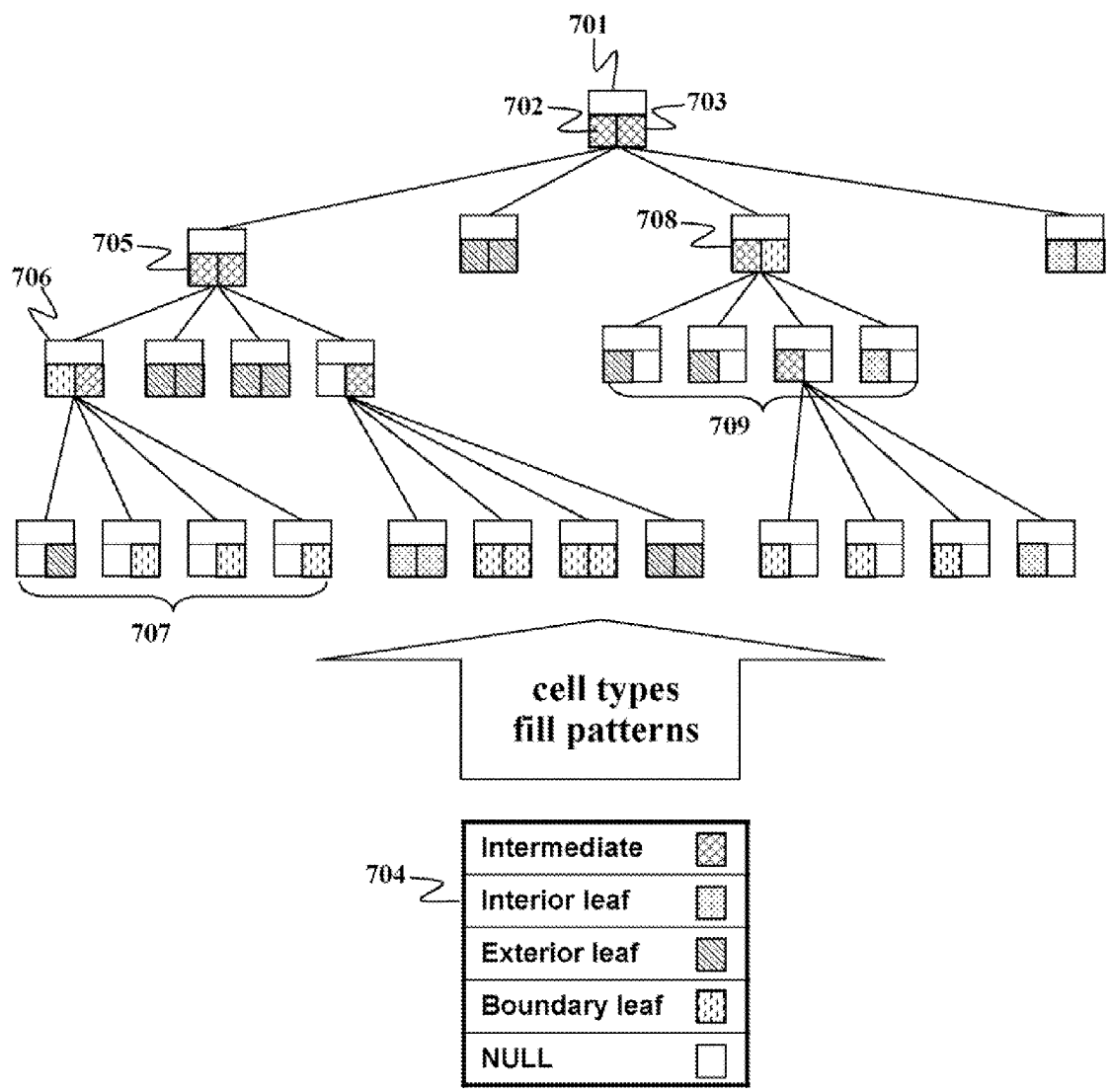
FIG. 7 is a diagram showing the tree data structure of a hybrid ADF.

For example FIG. 7 shows a tree data structure of the hybrid ADF cell, in which each intermediate cell has four children cells to simplify the illustration. A cell in the tree, for example a root cell 701, is associated with two identifiers, the sampled ADF type identifier 702 and the composite ADF type identifier 703. The table 704 shows the fill patterns used for various identifiers.

In this example, the root cell 701 is a sampled intermediate cell and a composite intermediate cell having children with both aspects. A cell 705 is also an intermediate cell in both aspects. However, a cell 706 is a sampled boundary cell and a composite intermediate cell. Therefore, the children cells of 706, indicated collectively as 707, have a sampled type identifier that is NULL, while the composite type identifier is either exterior type or boundary type. This can occur because the distance field reconstructed from the distance field value samples in cell 706 has a reconstruction error less than the predefined error-based subdivision threshold, but the cell 706 contains more geometric element distance field references than the count-based subdivision threshold. Cell 708 has the opposite characteristics. The cell 708 is a sampled intermediate cell as well as a composite boundary cell. Therefore the children of cell 708, indicated collectively by reference 709, have a composite type identifier that is NULL.

Editing Hybrid ADF Cells

Editing a hybrid ADF cell with a new geometric element distance field includes editing a sampled ADF cell, wherein the distance field sample values are altered by the values of the distance field of the new geometric element, and editing a composite ADF cell, wherein the set of geometric element distance fields associated with the cell may be altered by the new geometric element distance field. However, the editing of a hybrid ADF cell is not simply the trivial combination of both tasks. Instead, the set of distance functions that are part of the composite ADF aspect of the cell improves the set of distance samples associated with the sample ADF aspect of the cell. Similarly, the set of distance samples associated with the sampled ADF aspect of the cell improves the quality of the composite ADF aspect of the cell, i.e., the set of distance functions.

Figure 8:
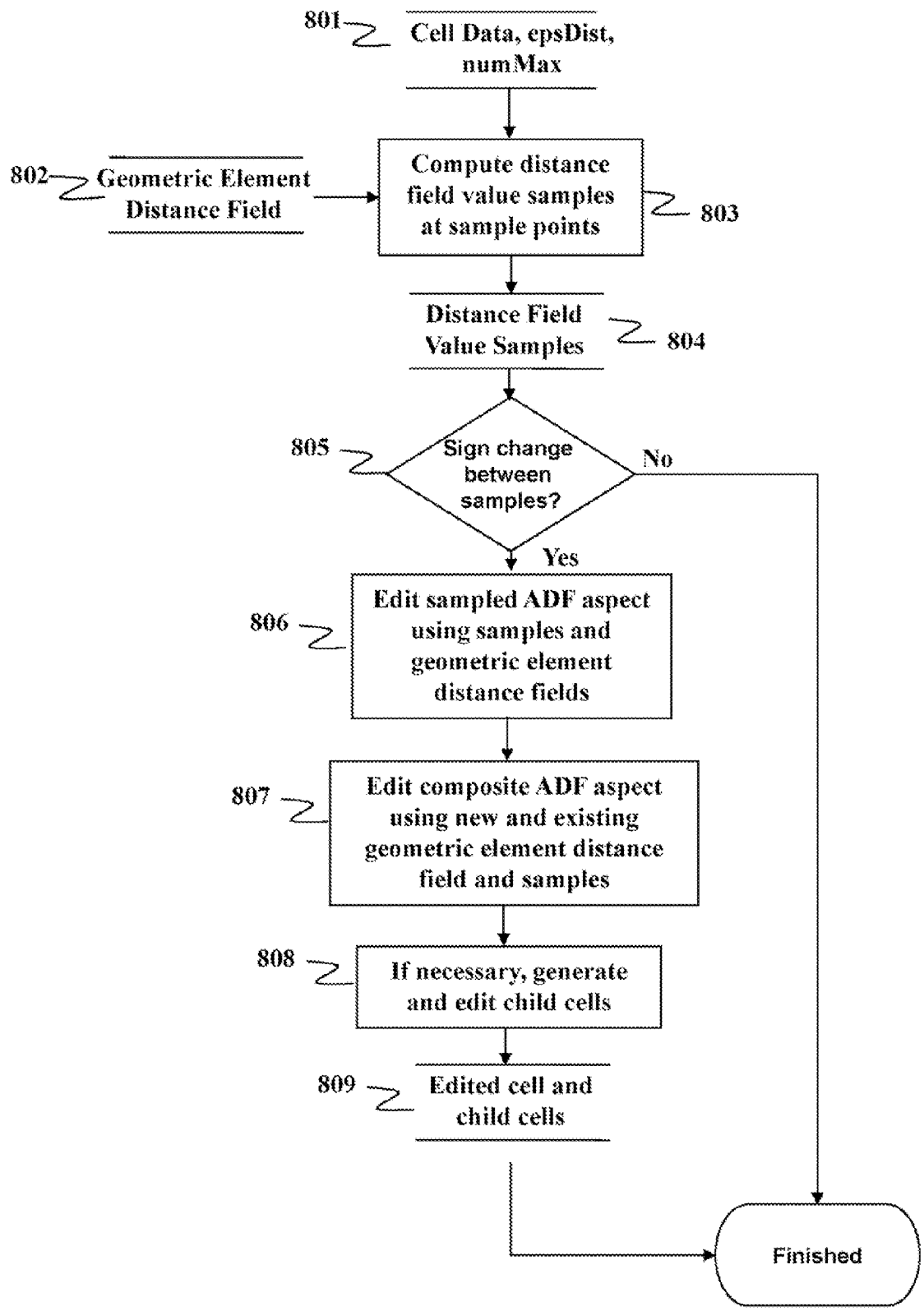
FIG. 8 is a flow chart showing the editing of a hybrid ADF cell by a geometric element.

FIG. 8 shows a flow chart of a method for the editing a hybrid ADF cell 801 by a distance function 802 of a new geometric element distance field. The method starts by sampling the distance function at a set of sample points 803 within the cell, for example at the cell vertices. The resulting subset of distance samples 804 is tested 805 to determine if boundary of the new geometric element distance field 802 is within the cell.

For example, in one embodiment the testing include determining if there is a change in sign between any of the samples. If there is no sign change, then the editing of the cell is completed. Otherwise, the sampled ADF aspect of the cell is edited 806 using the subset of distance samples and the set of distance function of existing geometric element distance fields. Then, composite ADF aspect of the cell is edited 807 using the distance function 802 and the subset of distance samples 804. After testing subdivision criteria 808, if the subdivision criterion for either aspect of the cell is met, the cell is partitioned into children cells and the children cells are edited using the new and existing geometric element distance fields 809.

Figure 9A:
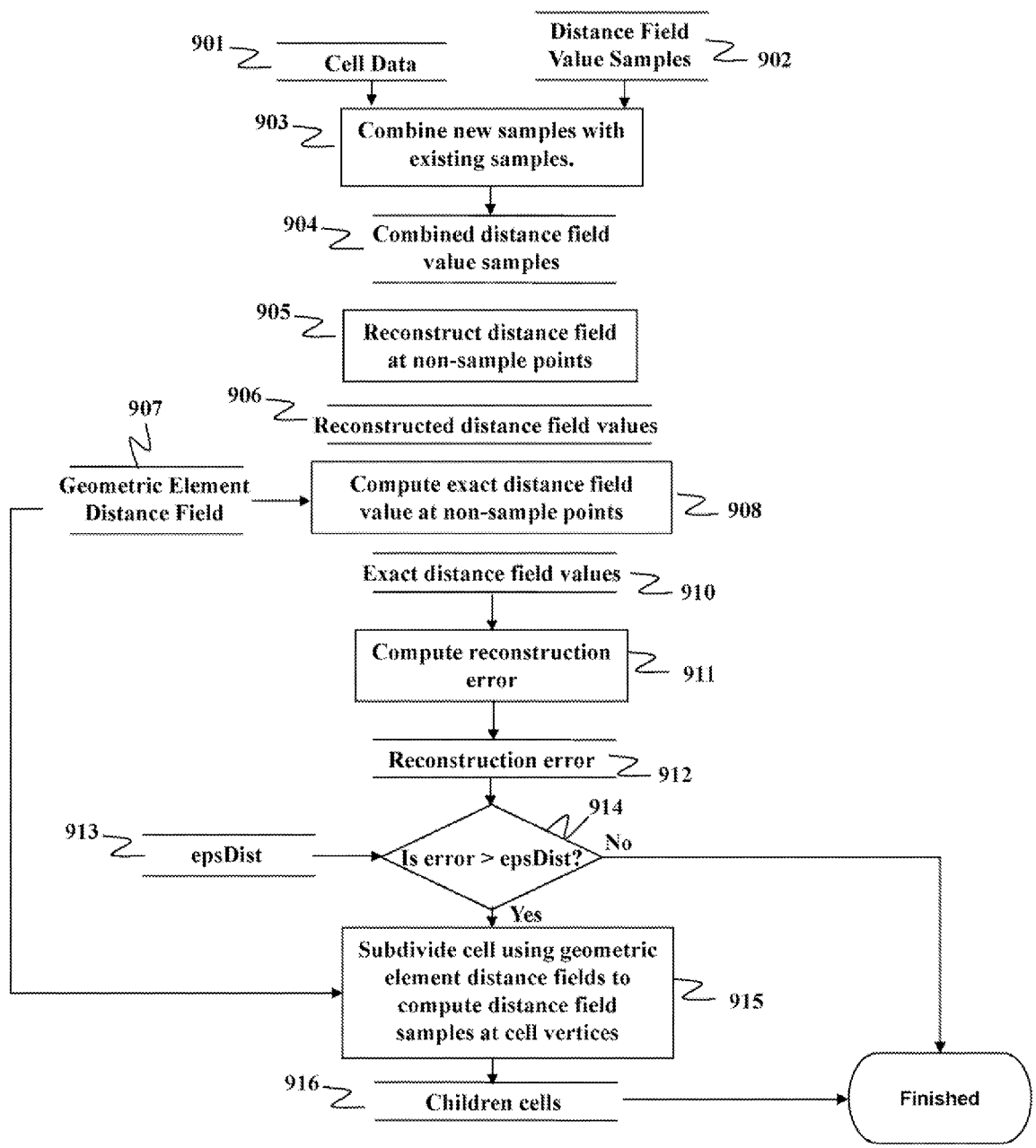
FIG. 9A is a flowchart showing the editing of the sampled ADF aspect of a hybrid ADF cell.

FIG. 9A shows a flow chart of a method for editing the sampled ADF aspect of hybrid ADF cell 901. The subset of distance samples 902 associated with the distance filed of a new geometric element are combined 903 with the existing set of distance samples of the hybrid ADF cell 901 using a combining function, for example Boolean difference, resulting in the combined distance field value samples 904.

From the combined distance field value samples 904, the distance field is reconstructed 905 at a set of non-sample points resulting in a set of reconstructed distance field values 906. Using the new geometric element distance field 907, the exact distance field is computed at the same non-sample points used in the reconstruction 905 resulting in a set of exact distance field values 910. The reconstruction error is computed 911 at the non sample points by taking the difference between the exact distance field values 910 and the reconstructed distance field value 906 resulting in a reconstruction error 912. The magnitude of the reconstruction error 912 is compared 914 to predetermined error, e.g., epsDist 913. If the error is greater than the maximum error, and the cell level is less than the maximal depth of the octree the cell is partitioned.

In a conventional sampled ADF of the prior art the distance field samples of the cell are initialized from the distance field samples of its parent cell. For example, if the distance field samples correspond to the positions of the cell vertices, then the value of the distance field is reconstructed using the reconstruction function at the positions of the vertices of the children cells and assigned to the distance fields samples of the children cells. However, this reconstructed distance field is only approximate.

In contrast, in one embodiment of the invention, the distance field samples of the children cells are determined exactly 915 from the geometric element distance fields of the composite ADF aspect of the hybrid ADF cell instead of approximated from the distance field samples. Accordingly, the distance field reconstructed from the distance field samples of the hybrid ADF cell is more accurate than is obtained by the conventional subdivision in sample ADF cells.

Ray Intersection with Hybrid ADF

The determination of the intersection point of a ray with the composite surface of a hybrid ADF cell is an important process for both rendering of the hybrid ADF to an image stored in a memory, as well as to cell culling by ray sampling. To determine the intersection point of a ray with the composite surface, the intersection point of the ray with each geometric distance field is first determined, and then the intersection points are tested to determine which point is on the composite boundary. The testing depends on the application. In a machining simulation application the distance fields of the geometric elements are combined using only the Boolean subtraction operator. In the case of machining simulation, a point is on the composite boundary if it is one the boundary of one or more geometric element distance fields (i.e., d=0) and inside of all of the other geometric element distance fields (i.e., d>0).

Therefore the determination of the ray intersection with the composite boundary begins with the determination of the ray intersection with the geometric element distance fields. For most types of geometric elements used in machining simulation, the distance field of the geometric element can be complex so that an analytic approach to determining the ray intersection is suboptimal.

Figure 9B:
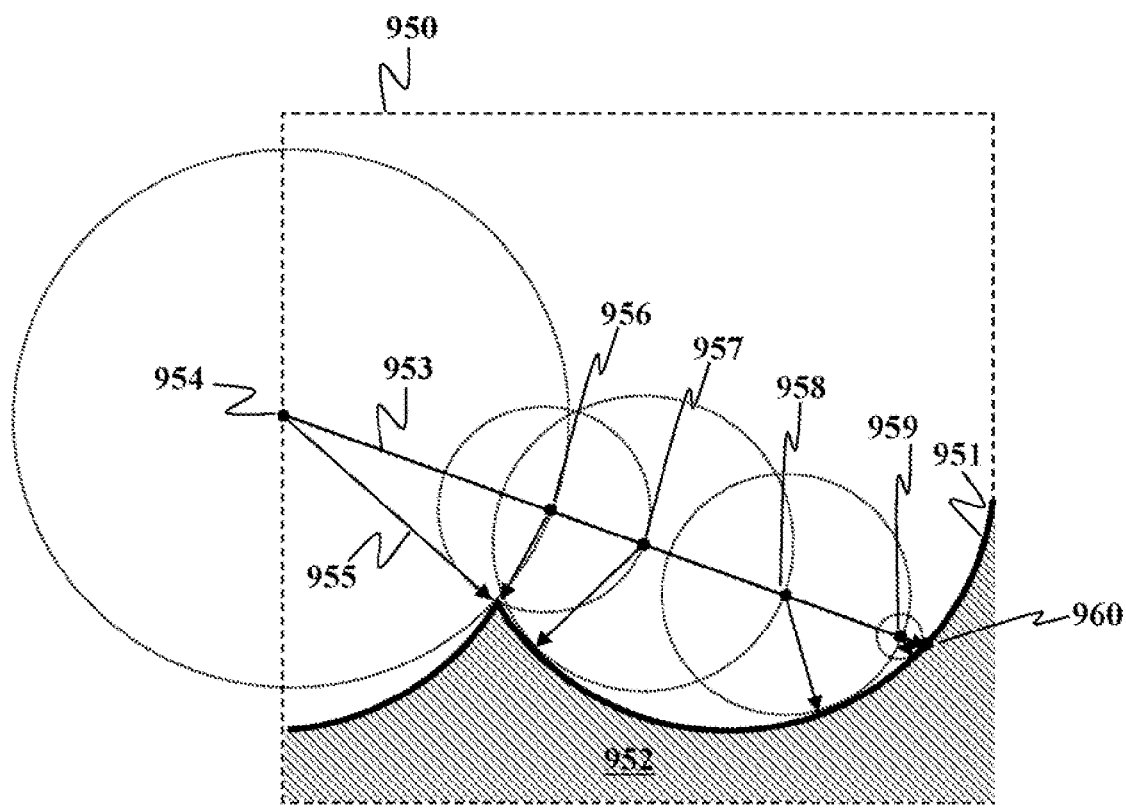
FIG. 9B is a schematic of a method of intersection of a ray with the boundary of a geometric element using an iterative numerical method.

FIG. 9B shows an example of sphere casting method. A hybrid ADF cell 950 includes a boundary 951 of a geometric element distance field such that the interior or the geometric object is indicated 952. A ray 953, whose intersection with the boundary of the geometric object 951 must be determined, intersects the cell boundary at 954.

Starting at the intersection point of the ray with the cell boundary 954, the distance 955 to the boundary of the geometric element 951 is computed. From the distance 955, a new test point 956 is determined with a distance 955 along the ray 953. This process is iterative repeated resulting in test points 957, 958, and 959 before the ray 953 intersects the boundary of the geometric element 951 at point 960.

Sphere casting is well known to converge correctly to the boundary of a geometric element distance field. However, when the ray is close to the boundary and moving in a direction that is nearly parallel to the boundary of the geometric element distance field, each step in the sphere casting may be quite small. Therefore, even though the intersection of the ray with the surface is guaranteed, the rate of convergence to the surface can be very slow. Therefore, it is further object of some embodiments of the invention to use the distance field samples of a hybrid ADF cell to accelerate the determination of the ray intersection with a geometric element distance field within the cell.

Figure 10:
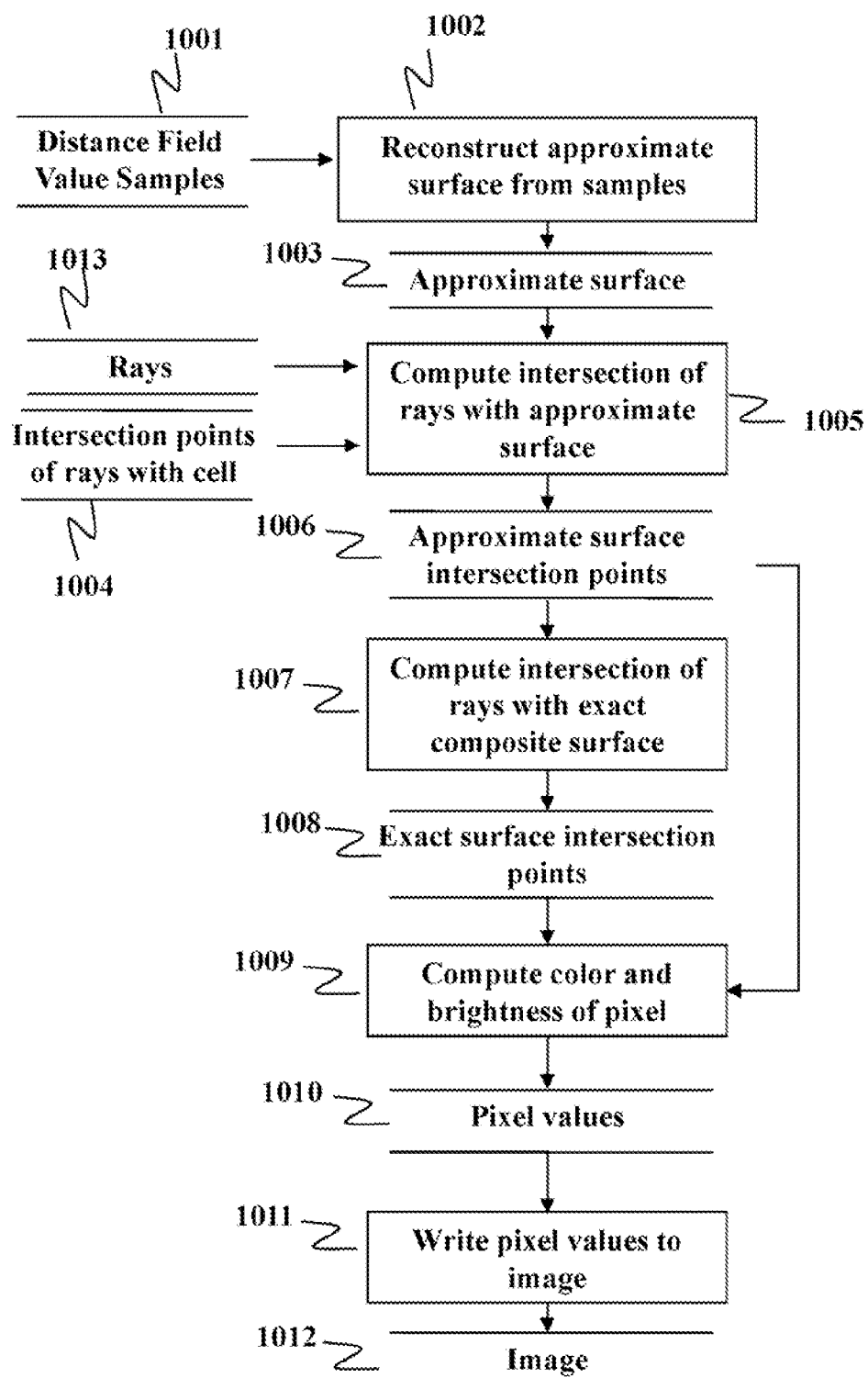
FIG. 10 is a flowchart showing a method of rendering an image of the composite surface within a hybrid ADF cell.

Referring to FIG. 10, ray intersection with the composite surface starts with the reconstruction 1002 of an approximate surface 1003 from the distance field value samples 1001. The intersection of a set of rays 1013, starting at the 'cell boundary 1004 with the approximate surface 1003, is computed 1005 by any available method, such as trilinear interpolation, resulting in a set of approximate surface intersection points 1006. These approximate surface intersection points 1006 are much closer to the exact composite surface than the intersection points with the cell boundary 1004. Therefore, the intersection of the rays 1013 with the exact composite surface 1008 can be computed 1007 by a composite surface intersection method, such as a sphere casting method, in fewer iterations, when starting from the approximate surface intersection points 1006. This method reduces the number of iterations needed by the ray intersection method, resulting in faster rendering of images 1012 and culling of cells by ray sampling. From the set of exact surface intersection point 1008, the pixel values 1010 associated with each ray can be computed 1009 by a lighting method, such as Phong's lighting method. The resulting pixel values 1010 are then written 1011 into an image 1012.

Rendering of Hybrid ADF Cells

It is a further object of one embodiment of the invention to alternately render into the image 1012 the approximate surface intersection points 1006. The approximate surface 1003 can be similar to the exact surface. For some applications it is an acceptable alternative when the exact surface is not necessary. Furthermore, it is always faster to determine the approximate surface than the exact surface. Given the set of approximate surface points 1006 associated with the set of rays 1013, a set of pixel values 1010 can be computed 1009 by, e.g., a lighting method, such as Phong's light method, and written 1011 to an image 1012.

Culling of Hybrid ADF Cells

Editing the composite ADF aspect of a hybrid ADF cell using the distance field of a geometric element involves determining whether the new geometric element contributes to the composite boundary within the hybrid cell, and additionally whether any geometric element previously associated with the composite ADF aspect of the hybrid ADF cell now no longer contributes to the composite boundary. This process, called cell culling, should be fast to obtain a useful simulation system, but also accurate so that the distance field reconstructed from the geometric element distance fields associated with the cell is correct.

A conventional culling is performed by ray sampling, in which the intersection of a set of rays with the composite boundary is determined, and for each ray that intersects the composite boundary, a geometric element distance field that forms the composite boundary is determined. After all of the rays have been processed, any geometric element distance field that was not found to contribute to the composite surface is removed from the cell.

Figure 11:
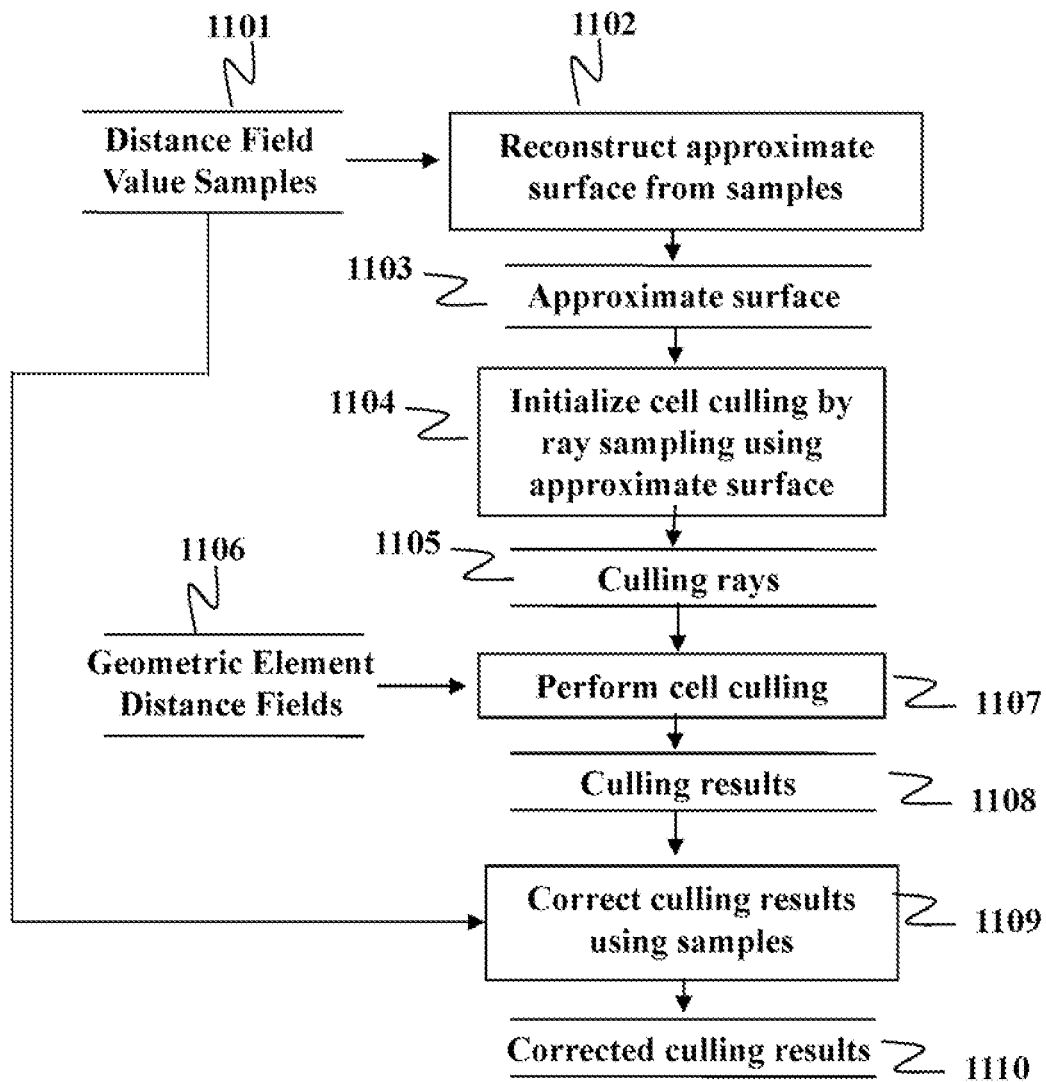
FIG. 11 is a flowchart showing a method if culling hybrid ADF cells by ray sampling.

FIG. 11 shows a flow chart of a method of culling hybrid ADF cells. In the same manner described for other embodiment of the invention, the distance field sample values 1101 can be used to accelerate the culling by ray sampling method. An approximate surface 1103 is reconstructed 1102 from the distance field value samples 1101 by a reconstruction method, such as trilinear reconstruction. The intersection of the culling rays 1105 with the geometric element distance fields 1106 of the hybrid ADF cell can be accelerated by initializing the culling rays 1104 at the approximate surface 1103. For each culling ray 1105 one of the set of geometric element distance field is determined to be part of the composite surface. After all culling rays have been processed the culling results 1108 are obtained consisting of a subset of the set of geometric element distance fields 1106.

Culling by ray sampling is fast and accurate. However, culling by ray sampling sometimes misses small parts of the composite surface with the result that the subset of the set of geometric element distance fields in the culling results 1108 may not include all of the geometric element distance fields that contribute to the composite boundary with the cell. The composite boundary reconstructed from the incorrect subset may, therefore, exhibit significant errors.

The availability of distance field sample values in the hybrid ADF cell improves the accuracy of cell culling according to one embodiment of the invention. Each distance field sample value corresponds to the distance from the sample point to the composite boundary within the hybrid ADF cell. These distances to the composite boundary cannot be changed by the culling process without also changing the shape of the composite boundary.

Therefore, in one embodiment of the invention, the distance field samples are used to avoid errors in the culling of the hybrid ADF cell's geometric element distance fields. Before culling, the correct values of the distance field value samples are known at the sample points. After the culling, the culling results 1108 are corrected 1109 by recomputing the distance field values at the sample points using the culling results. The recomputing is done by combining, using the combining function, the values at the sample points of the subset of the set of geometric element distance fields in the culling results. If the recomputed values do not match the original values, then the culling results are corrected 1109, where the correction 1109 is done by searching the list of removed geometric element distance fields for the subset of removed geometric distance fields that corrects the error, or errors. Each error in the culling results is corrected by restoring one or more geometric element distance fields to the hybrid ADF cell. The correction method 1109 results in corrected culling results 1110 consisting of a larger subset of the set of geometric element distance fields. By this means, reconstruction errors resulting from cell culling errors are reduced.

Editing Preferences

A hybrid ADF provides the user with the ability to select editing preferences that optimize the performance of a hybrid ADF-based simulator for different applications. For example, in some applications the exact composite boundary is never needed and therefore any time spent processing a geometric element distance field after the initial editing of cells is unnecessary. In this case a "purely sampled" editing preference can be selected that results in the generation of a hybrid ADF that is indistinguishable from a sampled ADF.

Alternately, the application may require that an exact composite boundary is always generated and an approximate boundary is never needed. In this case, a "purely composite" editing preference can be selected that results in the generation of a hybrid ADF that is indistinguishable from a composite ADF.

As a third possibility, the application may require an exact composite boundary eventually. However, an approximate composite boundary should be created as quickly as possible. In this case, a "preferred sampled" editing preference can be selected where some operations of the editing of the hybrid ADF needed for complete generation of the composite ADF aspect of the hybrid ADF, such as cell culling, are deferred until after generation of the sampled ADF aspect of the hybrid ADF is completed.

Local Hybrid ADF Generation

One embodiment optimizes simulation by generating the hybrid ADF only for part of the object. For example, instead of concurrently generating the sampled ADF and composite ADF aspects of the hybrid ADF, a "purely sampled" hybrid ADF can be generated initially. The purely sampled hybrid ADF is fast to generate and can be rendered quickly and interactively in comparison to the "complete" hybrid ADF wherein both the sampled ADF aspect and composite ADF aspect are completely generated. The user can then select smaller regions of the hybrid ADF wherein the composite ADF aspect will be generated during a second generation step. By this means, an exact composite boundary can be determine more quickly, because it represents only a fraction of the total hybrid ADF, and only in regions of the hybrid ADF that the user needs.

Operating Environment

The invention is operational with numerous general purpose or special purpose computing system environments or configurations. Examples of well known computing systems, environments, and/or configurations that are suitable for use with the invention include, but are not limited to, personal computers, server computers, handheld or laptop devices, multiprocessor or multi-core systems, graphics processing units (GPUs), application-specific integrated circuits (ASICs), field programmable gate arrays (FPGAs), microcontroller-based systems, network PCs, mainframe computers, distributed computing environments that include any of the above systems or devices, and the like, i.e., generally processors. A monitor or other type of output device 160 is connected to any of the above systems to enable visualization 162 of the invention. For example, a permanent full or larger scale result of the simulation is required, a printer can be used.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a non-transitory computer-readable medium or multiple computer readable media, e.g., a computer memory, compact discs (CD), optical discs, digital video disks (DVD), magnetic tapes, and flash memories. The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for generating a model of an object, wherein the model represents the object by a hybrid adaptively sampled distance field formed by a spatial hierarchy of cells, wherein at least one cell is associated with a set of distance samples and a set of distance functions, the method comprising steps of:
    sampling a distance function for the cell to produce a subset of distance samples;
    modifying the set of distance samples of the cell with the subset of distance samples; and
    modifying the set of distance functions of the cell with the distance function, wherein the steps of the method are performed by a processor, wherein the cell is associated with a sampled type determined based on the set of distance samples, and a composite type determined based on the set of distance functions, wherein the sampled and the composite types indicate a relationship of the cell with a boundary of the object, and wherein the types are selected from a group consisting of an intermediate cell, an exterior leaf cell, an interior leaf cell, and a boundary leaf cell, and further comprising:
    testing a sampled subdivision criteria for the sampled type of the cell and a composite subdivision criteria for the composite type of the cell; and
    generating children of the cell if at least one of the sampled subdivision criteria or the composite subdivision criteria is met.

2. The method of claim 1, wherein the modifying the set of distance functions of the cell is based on the set of distance samples of the cell.

3. The method of claim 1, wherein the modifying the set of distance samples of the cell is based on the set of distance functions of the cell.

4. The method of claim 1, wherein the sampling is performed for each vertex of the particular cell, further comprising:
    determining, based on signs of values in the subset of distance samples, whether a surface of a geometric element represented by the distance function intersects the cell.

5. The method of claim 1, further comprising:
    determining an error between a surface reconstructed from the set of distance samples and a surface determined by combining the set of distance fields; and checking the sampled subdivision criteria based on the error.

6. The method of claim 1, further comprising:
determining a set of distance samples of a child cell of the cell based on the set of distance functions of the cell.

7. The method of claim 1, further comprising:
determining a number of distance fields in the set of distance fields; and
checking the composite subdivision criteria based on the number.

8. A method for simulating a model of an object, comprising steps of:
initializing a simulation using an adaptively sampled distance field formed by a spatial hierarchy of cells, wherein at least one cell includes a set of distance functions and a set of distance samples of at least some of the distance functions;
sampling a distance function of the cell to produce a subset of distance samples;
determining based on signs of values in the subset of distance samples whether a surface of a geometric element represented by the distance function intersects the cell;
determining based on the values in the subset of distance samples whether the distance function forms a composite surface of the model of the object within the cell;
modifying the set of distance samples of the cell with the subset of distance samples; and
modifying the set of distance functions of the cell with the distance function, wherein the steps of the method are performed by a processer.

9. The method of claim 8, further comprising:
reconstructing, based on the set of distance samples, an approximate surface of the model of the object within the cell using the set of distance samples;
determining approximate intersection points of a set of rays with the approximate surface;
determining exact intersection points of the set of rays with the composite surface based on the approximate intersection points and the set of distance functions; and
determining, based on the exact intersection points, pixel values associated with each ray in the set of rays.

10. The method of claim 9, further comprising:
rendering at least part of the approximate surface; and
rendering at least part of the composite surface.

11. The method of claim 8, further comprising:
culling the particular distance function based on the set of distance samples.

12. The method of claim 11, wherein the culling comprises:
determining an error between the set of distance samples and the subset of distance samples; and
culling the distance function based on the error.

* * * * *